United States Patent [19]

Shen

[11] 4,207,542

[45] Jun. 10, 1980

[54] MULTIPLE SHOCK AERODYNAMIC WINDOW

[75] Inventor: Peter I. Shen, Torrance, Calif.

[73] Assignee: The United States of America as represented by the Secretary of the Air Force, Washington, D.C.

[21] Appl. No.: 898,049

[22] Filed: Apr. 20, 1978

[51] Int. Cl.$^2$ .............................................. H01S 3/00
[52] U.S. Cl. ..................... 331/94.5 G; 331/94.5 C; 350/319
[58] Field of Search ............... 331/94.5 G, 94.5 C, 331/94.5 D; 350/319

[56] References Cited

U.S. PATENT DOCUMENTS

| | | | |
|---|---|---|---|
| 3,604,789 | 9/1971 | McLafferty | 350/319 |
| 3,617,928 | 11/1971 | Hausmann | 331/94.5 G |
| 3,654,569 | 4/1972 | Hausmann | 331/94.5 G |
| 3,902,136 | 8/1975 | Finkleman et al. | 331/94.5 G |
| 3,973,217 | 8/1976 | Guile | 331/94.5 C |
| 3,998,393 | 12/1976 | Petty | 331/94.5 G |

Primary Examiner—James W. Davie
Attorney, Agent, or Firm—Joseph E. Rusz; Jacob N. Erlich

[57] ABSTRACT

A multiple shock aerodynamic window for use within a laser system. The aerodynamic window provides separation between the pressure within the laser cavity and the ambient pressure adjacent thereto. Making up the aerodynamic window is an entrance duct and a capture duct situated transverse to a laser beam output passageway leading from the laser cavity. A wedge-shaped element is located in the entrance duct, partially protruding into the passageway. A diffuser vane is located in the capture duct. Upon the passing of a supersonic flow of gas through the entrance duct at least two shock waves are generated at the wedge-shaped element and cross the passageway. The diffuser vane intersects at least one of the shock waves thereby substantially reducing flow separation in the capture duct. In addition, the entrance wall of the capture duct may be inclined at an angle of approximately 16° in order to assist the diffuser vane in the reduction of flow separation in the capture duct.

12 Claims, 3 Drawing Figures

MULTIPLE SHOCK AERODYNAMIC WINDOW

STATEMENT OF GOVERNMENT INTEREST

The invention described herein may be manufactured and used by or for the Government for governmental purposes without the payment of any royalty thereon.

BACKGROUND OF THE INVENTION

Since the development of the first working lasers, considerable time and effort has been expended in the search for higher output laser systems. The possible applications of high power lasers are unlimited in the fields of communication, manufacturing, construction, medicine, space exploration and defense. Unfortunately many obstacles exist to the attainment of high power systems. Most lasers have low efficiency and therefore to obtain high power or high energy outputs, considerably more energy must be furnished to the system than is extracted. If this energy furnished is electrical, then the system cannot have a large average power and still be portable, as is desired in some cases. The relative size and weight of laser systems, and the availability of materials, have also introduced obstacles to their development.

The gas laser has grown out of the initial laser effort and is representative of one of the more sophisticated laser techniques which has the capability of providing very high power radiation output due primarily to the large gas handling capability characteristic of such a system and due to the large quantity of energy that can be added to the gases flowing in such systems.

A drawback in many of the high power gaseous lasers is that the material windows or reflectors which are used to isolate the medium within the laser may disintegrate under the power of the laser itself. To overcome this problem a compression-type aerodynamic window is utilized within the gaseous laser. Such a window uses supersonic flow to separate the low pressure laser cavity from the high pressure ambient environment while permitting the laser beam to be extracted from the window. One type of aerodynamic window is the single shock compression-type aerodynamic window. In the single shock aerodynamic window the shock is generated in the supersonic stream in order to support the ambient to cavity pressure difference, and the window offers an inherert advantage of good optical quality. Unfortunately, it is prone to flow separation in the capture duct and at the nozzle exit which feeds the supersonic flow.

Another type of aerodynamic window is the double shock window in which the double shock is generated by inserting a single wedge at the supersonic flow nozzle exit of the single shock window. An example of such an aerodynamic window is set forth in U.S. Pat. No. 3,654,569 issued Apr. 4, 1972. In such an arrangement the first shock is generated from the tip of the wedge and the second shock at the exit of the nozzle. In order to preserve the optical quality of the single shock window, the two shocks must not intersect within the optical path of the laser beam. As a result it requires slightly higher mass flow rates than with the single shock window. In addition, as the first two shocks coalesce, a slip-line and a weak wave may be generated from the intersection point. In addition, they may also propagate through the optical path. The optical degradation due to the slip-line and weak wave must be assessed in such window design. Furthermore, flow separation in the capture duct is more severe for the higher pressure ratio across the window, and must be solved in parallel with solving flow separation at the nozzle exit. Unfortunately, the known methods to eliminate flow separation such as boundary layer suction, blowing and wall cooling in the shock-boundary layer interaction region add mechanical complication to the entire laser system. As a result, a great need exists for the development of double shock aerodynamic window gas laser systems which alleviates the problems encountered in the past.

SUMMARY OF THE INVENTION

The instant invention sets forth a multiple shock aerodynamic window system which overcomes the problems set forth in detail hereinabove.

In order that the multiple shock aerodynamic window system become a workable system, elimination of flow separation in the capture duct must become an integral part of the entire laser system. This invention provides a novel arrangement which eliminates flow separation in the capture duct without using the mechanically complicated methods of boundary-layer suction and blowing of the past. For the pressure ratio in the order of three to four, a vane diffuser is utilized within the supersonic flow in order to eliminate flow separation. This vane diffuser is utilized in conjunction with a wedge and is essentially a thin plate having a sharp leading edge placed in the capture duct to intersect the oblique shock (or shocks). The leading edge is of wedge-like configuration of a small wedge angle (a few degrees) and with its flat surface facing the impinging shock or shocks. As a consequence thereof, the boundary layer along the same diffusion is thin. Flow separation, which may occur along the lower surface of the vane diffuser, is confined to a very small region because its scales linearly with the boundary layer thickness. In addition, the flow separation region may terminate with the vane tip in the free stream and it does not affect the optical quality of the window as long as the vane tip is located away from the optical path of the laser beam.

For higher pressure ratios, the wall contour is utilized in conjunction with the vane diffuser set forth above. The wall contour reduces the strengths of both incident and reflected shocks on the wall. Consequently, the overall pressure ratio required is reduced for the boundary layer to negotiate along the wall. It is essential that the wall contour arrangement be used together with the vane diffuser set forth hereinabove or the supersonic flow does not follow the wall contour angle. Therefore, the multiple shock aerodynamic window system of this invention can support much higher pressure ratio than the conventional single shock window or double shock window without flow separation at the nozzle exit end in the capture duct.

It is therefore an object of this invention to provide a multiple shock aerodynamic window system which is an effective substitute for material windows of the past.

It is another object of this invention to provide a multiple shock aerodynamic window system which eliminates flow separation in the capture duct and the required increased pressure ratio across the window.

It is a further object of this invention to provide a multiple shock aerodynamic window system which is economical to produce, highly reliable in operation and which utilizes conventional, currently available components that lend themselves to standard manufacturing techniques.

For a better understanding of the present invention together with other and further objects thereof, reference is made to the following description taken in conjunction with the accompanying drawings and its scope will be pointed out in the appended claims.

DETAILED DESCRIPTION OF THE PREFERRED EMBODIMENT

Figure 1:
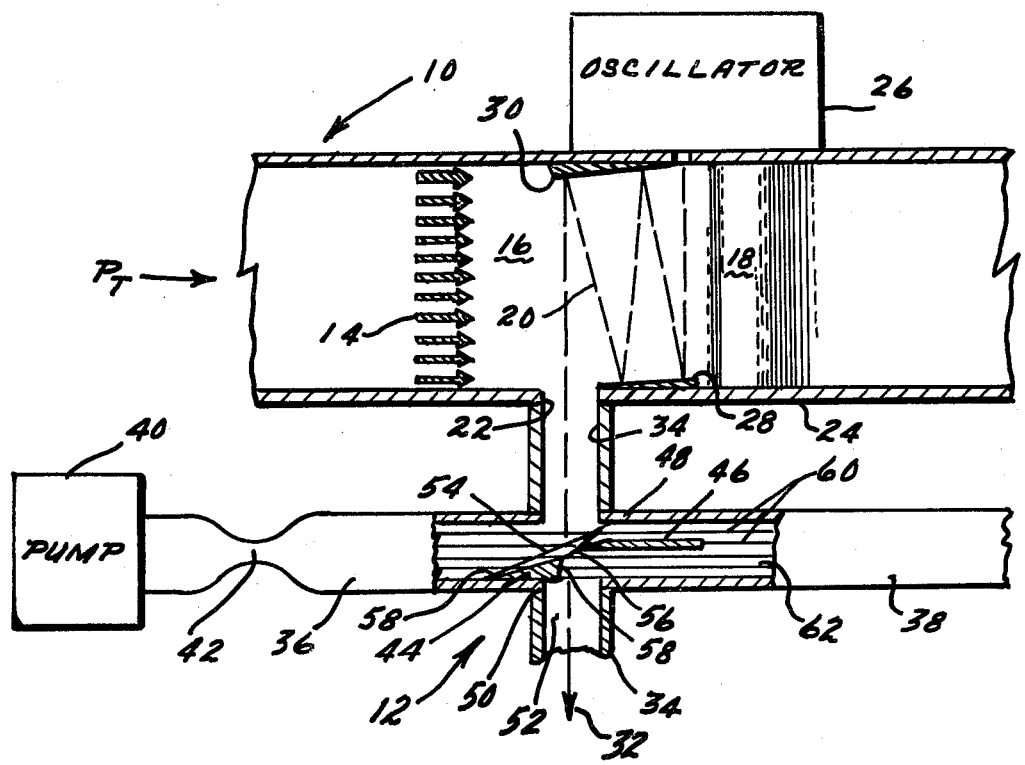
FIG. 1 is a side elevational, pictorial representation of the multiple shock aerodynamic window of this invention situated within a gas laser system and shown segmented and partly in cross-section.

Reference is now made to FIG. 1 of the drawing which best shows a laser system 10 into which the multiple shock aerodynamic window 12 of this invention is incorporated. Laser system 10, for purposes of illustration, is in this instance a gas laser, however, it should be realized that even though a gas laser system may be preferable with the aerodynamic window 12 of this invention, window 12 may be operational within a variety of other laser systems.

Gas laser system 10 is made up of a nozzle 14, a laser cavity 16 and a diffuser 18. A laser beam 20, formed within cavity 16 in a conventional manner is directed through an aperture 22 located within housing 24 of laser 10. An oscillator 26 directs laser beam 20 into laser cavity 16 and beam 20 is amplified between a resonator in the form of reflecting surfaces 28 and 30 to produce output 32 of laser beam 20. A passageway 34 extends away from and surrounds aperture 22 through which the output 32 of beam 20 passes from cavity 16.

Located in optical alignment with aperture 22 and connected to passageway 34 is the multiple shock aerodynamic window 12 of this invention. Aerodynamic window 12 is formed of an entrance duct 36 and a capture duct 38. Capture duct 38 intersects passageway 34 at a point directly across from the intersection of entrance duct 36 to receive flow therefrom. Any conventional pump 40 supplies high pressure air or other gas to a Laval nozzle 42 located within duct 36 and which provides a uniform supersonic flow in duct 36.

Making up multiple shock aerodynamic window 12 is a wedge 44 situated in input duct 36, a diffuser vane 46 located in capture duct 38 and specifically contoured walls 48 of capture duct 38, the detailed description of which will be set forth in detail hereinbelow with respect to FIG. 2 of the drawing.

The aerodynamic window 12 of this invention utilizes supersonic flow to separate the low pressure laser cavity 16 from the high pressure ambient environment while permitting laser beam 20 to be extracted as output beam 32 through window 12. In the prior art as shown in U.S. Pat. No. 3,654,569 a single wedge is situated at the supersonic flow nozzle exit generating a first shock from the tip of the wedge and the second shock at the exit of the nozzle. Such an arrangement, as pointed out more specifically hereinabove, is prone to produce flow separation in the capture duct and at the nozzle exit which feeds the supersonic flow.

Figure 2:
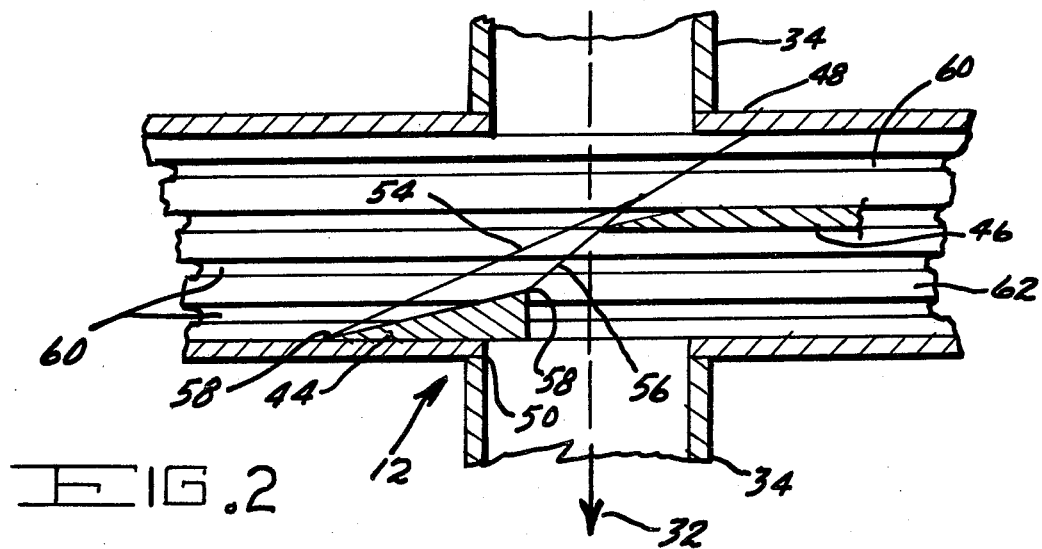
FIG. 2 is an exaggerated side elevational view of the multiple shock aerodynamic window of this invention shown partly in cross-section.

Referring now to FIGS. 1 and 2 of the drawing, the instant invention utilizes a wedge 44 mounted at the edge of the exit 50 of duct 36 and protrudes into the optical path 52 of aerodynamic window 12. As a result thereof, two shocks 54 and 56 are produced. The upstream shock 54 is generated at the leading edge 58 of wedge 44 as the supersonic flow tries to accommodate the wedge angle. The downstream shock 56 is produced at the exit edge 60 of wedge 44 to support the remainder of the pressure ratio. Invisid flow theory indicates that the Mach number decreases only slightly as the supersonic flow crosses a weak oblique shock. Consequently, as long as the boundary layer is not separated by the upstream shock 54, the multiple aerodynamic window 12 of this invention can support a high pressure ratio. The pressure ratio supported by the double shock increases with the wedge angle until flow separation takes place at the leading edge of wedge 44.

For moderate pressure ratios, the instant invention utilizes a vane diffuser 46 to eliminate flow separation in capture duct 38. Diffuser vane 46 extends almost to the end of the capture duct 38 and essentially divides capture duct 38 into two compartments. The diffuser-like effect is essential in elimination of flow separation downstream of laser cavity 16.

Diffuser vane 46 is preferably made of metal such as stainless steel and is mounted within a slot 60 located in the side wall 62 of capture duct 38. This arrangement is clearly illustrated in FIG. 2 of the drawing. Under certain circumstances it is necessary to move vane 46 vertically within capture duct 38 and, therefore, a plurality of slots 60 are milled on each sidewall 62 in capture duct 38.

Figure 3:
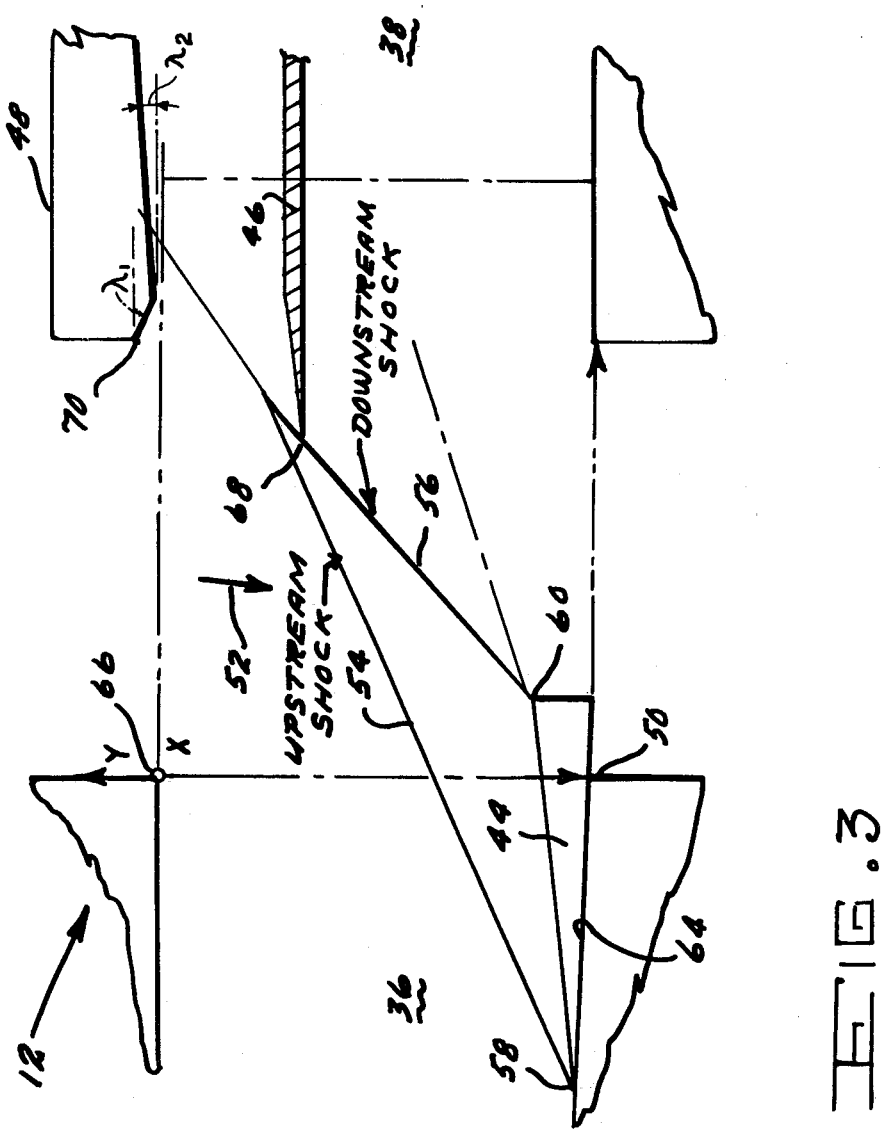
FIG. 3 is a schematic representation of the multiple shock aerodynamic window of this invention.

An example of the positioning and relative sizes and angular relationships between wedge 44 and diffuser vane 46 is best shown in FIG. 3 of the drawing. Although not limited to the following dimensions, a wedge 44 having a wedge angle of 9° and being 3.6 inches in length produces excellent results. Such a wedge 44 is placed on the lower surface 64 of the exit of entrance duct 36, situated in such a manner as to protrude 0.7 inches into the optical path 52.

Vane 46 is generally 0.156 inches thick, 9 inches long and has a 6° leading angle. Fixing the coordinates X and Y on the upper edge 66 of duct 36, the tip 68 of vane 46 is located 1.12 inches below the center of the coordinates and 3 inches downstream of the nozzle exit or entrance duct exit 50. Since vane 46 is mounted within any one of slots 60, it can be moved horizontally or vertically with relative ease. Once in position, however, vane 46 can be fixedly mounted by any conventional fastening means (not shown) and not part of this invention.

Diffuser vane 46 is designed to deflect the oblique shocks 54 and 56 before they impinge upon the boundary layer along capture duct 38. Vane 46 may be utilized to intersect either one or both of the shocks 54 and 56 (in FIG. 3 it is shown intersecting shock 56). The principle behind the utilization of diffuser vane 46 with wedge 44 in the aerodynamic window 12 of this invention is two fold. Firstly, the boundary layer along the same diffusion is thin. Flow separation, which may occur along the lower surface of vane 46 is therefore confined to a very small region because it scales linearly with the boundary layer thickness. Secondly, the flow separation region may terminate with tip 68 of vane 46 in the free stream and it does not affect the optical quality of window 12 as long as tip 68 is located away from the optical path 52 of output 52 of laser beam 20. The combination of wedge 44 and diffuser vane 46 is acceptable for a pressure ratio in the order of 3 to 4 to eliminate flow separation.

For higher pressure ratios, vane diffuser 46 must be used in conjunction with wall 48 being contoured in the manner set forth hereinbelow. The wall contour reduces the strength of both incident and reflected shocks on wall 48. Consequently, it reduces the overall pressure ratio required for the boundary layer to negotiate along wall 48. It is critical, however, that when wall contouring is utilized, that it be utilized in conjunction with diffuser vane 46. Otherwise, the supersonic flow will not follow the wall contour angle.

As an oblique shock impinges upon a solid surface, it is reflected as an oblique shock. The strength of the reflected shock is almost as strong as the incident shock. However, the strength of the reflected shock may be greatly reduced by tilting the wall into the direction of the incident shock. The effects of inclining wall 48 an inclination angle, $\lambda_2$, as shown in FIG. 3 of the drawing affects the total pressure ratio across both the incident and reflected shocks. For example, for Mach 3.2 and $\gamma$ of 1.4 the zero strength shock reflection for the incident shock of a pressure ratio of 4.5 requires an inclination angle, $\lambda_2$, of 19°. Generally the wall contour is moved to provide sufficient stand-off distance between cavity 16 and impinging shocks 54 and 56. It has been determined that cavity pressure decreases very rapidly as the wall inclination angle increases until $\lambda_2=16°$. Further increase in wall inclination angle results in little change in the cavity pressure.

In addition, cavity pressure increases slightly with increases in the slope or angle, $\lambda_1$, of the entrance 70 to capture duct 38. The pressure pertubation, however, behaves opposite to cavity pressure, that is, the pertubation is high at low cavity pressure and vice versa. Furthermore, results indiate that the cavity pressure decreases as the contour of wall 48 is moved upward to open up the flow channel downstream of cavity 16. It should also again be emphasized that the contouring of wall 48 is only effective when utilized in conjunction with vane diffuser vane 46.

As set forth hereinabove, for the pressure ratio in the order of 3 to 4, diffuser vane 46 is sufficient to eliminate flow separation. For pressure ratios greater than 3 to 4, contouring wall 48 upon which the oblique shocks 54 and 56 impinge and the use of diffuser vane 46 to deflect (or reflect) the oblique shock may be combined to confine the flow separation to a very small region. The important aspects of this invention are summarized hereinbelow:

(1) Vane 46 should be located far away from the shock coalescent point. If vane 46 intersects the shock near the coalescent point, vane tip 68 is likely to generate a third strong shock, which aggravates flow separation;

(2) If vane 46 is used to intersect both shocks 54 and 56, a strong shock reflection may take place on the vane surface and therefore cause severe sidewall flow separation;

(3) The minimum cavity pressure occurs when vane 46 is used to reflect the downstream shock 56 but where the vane tip 68 is located near the upstream shock 54; and (4) The tip 68 of vane 46 should be reasonably sharp. Vane 46 must be sufficiently long to function as a diffuser, but free of fluttering in the supersonic stream.

For the contour of wall 48, it is important that:

(1) The wall contour aspect of this invention be utilized in conjunction with vane diffuser 46;

(2) Contouring wall 48 in the direction of oblique shocks 54 and 56 has significant affect on the reduction of flow separation. A wall inclination angle, $\lambda_2$, of 16° appears to be optimum. It is also found that further increase in the wall angle beyond 16° has little effect on reducing flow separation; and (3) The standoff distance has a significant effect on isolating the cavity from the downstream flow separation. It is suggested that 3 to 4 boundary layer thicknesses should be provided to isolate the cavity 16 from the downstream flow separation.

Although this invention has been described with reference to a particular embodiment it will be understood to those skilled in the art that this invention is also capable of a variety of alternate embodiments within the spirit and scope of the appended claims. For example, a triple shock may be generated with the aerodynamic window 12 of this invention by the utilization of a double wedge inserted at the exit of duct 36 of supersonic nozzle 42. Such an arrangement is capable of supporting even higher pressure ratios, but requires more mass flow to operate than the double shock window set forth hereinabove. The mass flow rate required to operate window 12 increases rapidly with the number of shocks in the multiple shock aerodynamic window 12 of this invention.

I claim:

1. In a laser system having a housing, laser cavity, an aperture located within said housing adjacent said cavity, a passageway extending from and surrounding said aperture and an aerodynamic window optically aligned with said aperture in said housing, the improvement therein residing in said aerodynamic window, said aerodynamic window comprising means having its longitudinal axis extending transversely across said passageway for allowing a supersonic flow of gas to pass therethrough, means for providing gas to said supersonic flow passing means, said supersonic flow passing means being divided into an entrance duct and a capture duct, a wedge-shaped element located in said entrance duct and a diffuser vane located in said capture duct, at least two shock waves being generated at said wedge-shaped element and crossing said passageway, said diffuser vane intersecting at least one of said pair of shock waves, whereby said aerodynamic window substantially reduces flow separation in said capture duct.

2. In a laser system as defined in claim 1 wherein said pair of generated shock waves are formed of a first shock wave generated at the leading edge of said wedge-shaped element and a second shock wave generated at the exit edge of said wedge-shaped element, said diffuser vane intersecting said second shock wave.

3. In a laser system as defined in claim 1 wherein said wedge-shaped element protrudes into said passageway.

4. In a laser system as defined in claim 3 wherein said pair of generated shock waves are formed of a first shock wave generated at the leading edge of said wedge-shaped element and a second shockwave generated at the exit edge of said wedge-shaped element, said diffuser vane intersecting said second shock wave.

5. In a laser system as defined in claim 4 wherein said diffuser vane is adjustably mounted within said capture duct for movement in a direction both transverse and parallel to said longitudinal axis of said supersonic flow passing means.

6. In a laser system as defined in claim 1 wherein said capture duct has an entrance wall, said entrance wall diverging at a preselected angle with respect to said longitudinal axis of said supersonic flow passing means.

7. In a laser system as defined in claim 6 wherein said preselected angle is approximately 16°.

8. In a laser system as defined in claim 7 wherein said diffuser vane is adjustably mounted in said capture duct for movement in a direction both transverse and parallel to said longitudinal axis of said supersonic flow passing means.

9. A multiple shock aerodynamic window for providing a separation between two regions of differing pressures comprising a passageway having an inlet and an outlet, said inlet being connected to one region of pressure and said outlet being connected to another region of pressure, means having its longitudinal axis extending transversely across said passageway for allowing a supersonic flow of gas to pass therethrough, means for providing gas to said supersonic flow passing means, said supersonic flow passing means being divided into an entrance duct and a capture duct, a wedge-shaped element located in said entrance duct and a diffuser vane located in said capture duct, at least two shock waves being generated at said wedge-shaped element and crossing said passageway, said diffuser vane intersecting at least one of said shock waves thereby substantially reducing the flow separation in said capture duct.

10. A multiple shock aerodynamic window as defined in claim 9 wherein said wedge-shaped element protrudes into said passageway.

11. A multiple shock aerodynamic window as defined in claim 10 wherein said pair of generated shock waves are formed of a first shock wave generated at the leading edge of said wedge-shaped element and a second shock wave which is generated at the exit edge of said wedge-shaped element, said diffuser vane intersecting said second shock wave.

12. A multiple shock aerodynamic window as defined in claim 11 wherein said capture duct has an entrance wall, said entrance wall diverging at a preselected angle with respect to said longitudinal axis of said supersonic flow passing means.

* * * * *